(12) United States Patent
Di Nardo et al.

(10) Patent No.: US 7,258,221 B2
(45) Date of Patent: Aug. 21, 2007

(54) STORAGE UNIT FOR ELONGATED PRODUCTS

(75) Inventors: Walter Di Nardo, Lucca (IT); Mauro Gelli, Lucca (IT)

(73) Assignee: Fabio Perini S.p.A., Lucca (IT)

( * ) Notice: Subject to any disclaimer, the term of this patent is extended or adjusted under 35 U.S.C. 154(b) by 103 days.

(21) Appl. No.: 10/520,895

(22) PCT Filed: Jul. 4, 2003

(86) PCT No.: PCT/IT03/00423

§ 371 (c)(1),
(2), (4) Date: Jan. 11, 2005

(87) PCT Pub. No.: WO2004/009479

PCT Pub. Date: Jan. 29, 2004

(65) Prior Publication Data

US 2005/0173228 A1 Aug. 11, 2005

(30) Foreign Application Priority Data

Jul. 18, 2002 (IT) .............................. FI2002A0130
Mar. 13, 2003 (IT) .............................. FI2003A0066

(51) Int. Cl.
*B65G 37/02* (2006.01)
(52) U.S. Cl. .................... 198/347.3; 198/797; 198/801
(58) Field of Classification Search ............. 198/347.1, 198/347.3, 347.4, 797, 801
See application file for complete search history.

(56) References Cited

U.S. PATENT DOCUMENTS

| 3,643,787 | A | * | 2/1972 | Woof et al. ................. 198/802 |
| 4,757,892 | A | * | 7/1988 | Wenger ....................... 198/404 |
| 4,964,498 | A | * | 10/1990 | Klingl ....................... 198/347.1 |
| 4,995,769 | A | * | 2/1991 | Berger et al. ................ 414/403 |
| 5,253,743 | A | * | 10/1993 | Haas et al. ............... 198/347.1 |
| 5,473,978 | A | * | 12/1995 | Colombo ................... 99/443 C |
| 5,632,594 | A | * | 5/1997 | Missing .................... 414/746.7 |
| 5,788,057 | A | * | 8/1998 | Walser et al. ................ 198/797 |
| 6,053,304 | A | | 4/2000 | Biagiotti |
| 6,223,881 | B1 | * | 5/2001 | Carle ........................ 198/347.3 |
| 6,640,960 | B1 | * | 11/2003 | Spettl ....................... 198/347.1 |
| 6,758,321 | B2 | * | 7/2004 | Spettl ....................... 198/347.1 |
| 6,817,464 | B2 | * | 11/2004 | Biondi et al. ............ 198/347.1 |
| 6,840,368 | B2 | * | 1/2005 | Betti et al. ................ 198/347.3 |

FOREIGN PATENT DOCUMENTS

DE   90 12 074.4   12/1990

* cited by examiner

*Primary Examiner*—Joe Dillon, Jr.
(74) *Attorney, Agent, or Firm*—Breiner & Breiner, LLC

(57) ABSTRACT

The storage unit comprises at least two flexible members (55), equipped with supports (57) for the products to be stored, extending and moving along respective parallel paths defined by a plurality of driving wheels (59, 63). The supports (57) project laterally in respect of the relative flexible member. In each of the paths, in proximity to at least one driving wheel, a transfer member (71) is positioned to receive the products from the supports located on a branch (55A) of the respective flexible member upstream of said driving wheel and transfer them to the supports located on a branch (55B) of said flexible member downstream of said driving wheel in respect of the direction of feed of the flexible members along the respective paths, so that the products follow a trajectory that by-passes said driving wheel.

28 Claims, 6 Drawing Sheets

STORAGE UNIT FOR ELONGATED PRODUCTS

TECHNICAL FIELD

The present invention relates to a storage unit to store elongated products, such as cardboard tubes or the like, comprising at least two flexible members, equipped with supports for said products, extending and moving along respective parallel paths defined by a plurality of driving wheels.

More specifically, although not exclusively, the invention relates to a storage unit in which the flexible members are continuous and extend along respective closed paths.

STATE OF THE ART

In many industrial fields a filiform or web material is wound on tubular winding cores made of plastic, cardboard or another material. These tubular winding, cores (hereinafter also simply called <<cores>>), are stored in a storage unit and gradually fed to the machine that winds the filiform or web material. The products wound on the cores may for example be plastic films, fabrics, non-wovens, paper, tissue paper, or other products in films or in sheets of various types.

In the paper converting industry, to produce rolls of toilet tissue, kitchen towels and similar products processing lines are provided with one or more unwinding devices, which unwind the web material from corresponding reels of large diameter to feed it to a rewinder. The rewinder winds pre-established quantities of web material on cores usually made of cardboard, which are produced by so-called core machines normally positioned beside the rewinding machine. The cores are frequently simply accumulated in box storage units from which they are subsequently picked up by a belt or chain conveyor to be fed one at a time into the rewinder. The feed frequency of the cores is currently around 40 cores per minute or higher.

The logs formed by the rewinder have a diameter equal to the diameter of the final product destined for sale and a length equal to a multiple of the length of the finished product. The logs are therefore subsequently cut to form small finished rolls.

In the paper processing industry there is a tendency to use rewinding machines capable of winding logs of increasing axial length, that is to handle web material of increasing width. It has been found that when the cores are of considerable length, they tend to adopt an irregular position in current storage units and even tend to twist around one another, consequently breaking and causing jamming of the automatic flow towards the rewinder. This causes considerable problems during the production phase.

Analogous problems may occur in other sectors in which products of elongated shape and especially products with limited flexural strength must be accumulated and stored in a storage unit.

Storage units for temporarily storing logs produced by rewinders are currently known, provided with two flexible members in the form of parallel chains, secured to which are continuous oscillating supports extending from one flexible member to the other, on each of which a log is placed. The flexible members are disposed at a greater distance than the length of the logs to be handled. An example of a storage unit of this type is described in U.S. Pat. No. 6,053,304.

This type of storage unit cannot handle elongated objects that have limited transverse dimensions and are light (such as winding cores), as it is necessary to provide costly and cumbersome oscillating supports, which increase the cost of the storage unit.

OBJECTS AND SUMMARY OF THE INVENTION

The object of the present invention is to produce a unit for temporarily storing elongated products—especially although not exclusively tubes or tubular winding cores, for example in cardboard, for the production of logs of web material—which overcomes the drawbacks of prior art storage units and which also allows extremely long products with limited flexural strength to be handled.

In particular, one object of the present invention is to produce a storage unit particularly suitable for handling light and elongated products.

These and other objects and advantages, which shall become apparent to those skilled in the art by reading the text hereunder, are obtained with a storage unit of the type mentioned initially, in which the supports project laterally from the flexible members to which they are secured. Moreover, in each of the paths along which the flexible members move, in proximity to at least one driving wheel, a transfer member is positioned to receive products from the supports located on a branch of the respective flexible member upstream of the driving wheel and transfer them to the supports positioned on a branch of the flexible member downstream of said driving wheel in respect of the direction of feed of the flexible members along the respective paths. With an arrangement of this type the products are unloaded from the respective supports before they reach the portion of the flexible member driven around the driving wheel; they are transferred, via the transfer member to the opposite branch of the flexible member, following a trajectory that by-passes the driving wheel. In substance, the products are thus transferred from a descending branch to an ascending branch of the flexible members without interfering with the driving wheel positioned between the descending branch and the ascending branch.

In a currently preferred embodiment of the invention each of said supports is provided with two opposed surfaces to receive and hold the products on one or other of two sides of the support. In particular, this makes it possible for each product to rest on a first resting surface of the respective support before being transferred by the transfer member to a corresponding support of the opposed branch, on which the product is supported by the opposite surface. More generally, when the storage unit is provided with ascending and descending branches, the products will rest on a first surface of the supports on the ascending branches and on the opposed surface on the descending branches.

According to a possible embodiment of the invention, the supports all project from the same side of the respective flexible member. In particular, the supports may be oriented in respect of the flexible member so that they are all radially facing towards the axle of the driving wheel or wheels to which the respective transfer members are associated. In particular, the supports may extend at least partially (and in particular at their supporting surface) more or less according to a plane parallel to the plane on which the flexible member lies, that is the plane along which the path defined and followed by the flexible member in its movement extends. This member is preferably a chain, although a belt, especially a toothed belt, may also be used.

In a relatively simple embodiment of the invention, the transfer member comprises a transfer surface intersecting the trajectory of the supports carried by the branches upstream and downstream of the driving wheel to which the transfer member is associated. The transfer surface is inclined from the top downwards and from the descending branch to the ascending branch (which lie on a substantially vertical plane) to cause transfer of the products through gravity. With this arrangement the downward movement of the supports secured to the descending branch causes the products to pass from the supports to the transfer surface. They roll or slide along this surface until they meet corresponding supports moving from the bottom upwards along the ascending branch. By moving the transfer surfaces vertically the positions of the descending and ascending supports are synchronized in respect of the surfaces, that is an ascending support is positioned in front of the lowest point of the transfer surface at the appropriate moment to receive a product unloaded from a corresponding descending support.

In a per se known way each of the closed paths along which the continuous flexible members move can be defined by a first and by a second series of driving wheels with fixed axle, and by a first and by a second series of driving wheels with moving axle carried by a carriage or moving unit between the first and the second series of driving wheels with fixed axle. An architecture of this type is used in units for temporarily storing logs of web material and is described for example in U.S. Pat. No. 6,053,304. In this case, according to the invention a respective transfer member, carried by the moving unit, is typically associated with each of the driving wheels of the first series of driving wheels with moving axle.

Using a transfer member associated with each driving wheel of the first series of driving wheels it is possible to dispose each wheel of the first series of driving wheels with moving axle coaxially to a corresponding wheel of the second series of driving wheels with moving axle, so as to reduce the space occupied by the driving wheels with moving axle and thus the dimension of the moving unit, and to simplify the structure thereof, with consequent advantages in terms of overall dimensions of the storage unit and its production costs.

BRIEF DESCRIPTION OF THE DRAWINGS

The invention shall now be better understood by following the description and attached drawing, which shows a non-limiting practical embodiment of the finding. More specifically.

DETAILED DESCRIPTION OF THE PREFERRED EMBODIMENT OF THE INVENTION

In the description hereunder reference is made to a storage unit specifically produced to handle and store tubular cardboard cores for winding logs of web material, such as tissue paper, to produce rolls of toilet paper, kitchen towels or the like. It must, however, be understood that the same principles may be adopted to produce storage units for other types of elongated products with analogous advantages.

Figure 1:
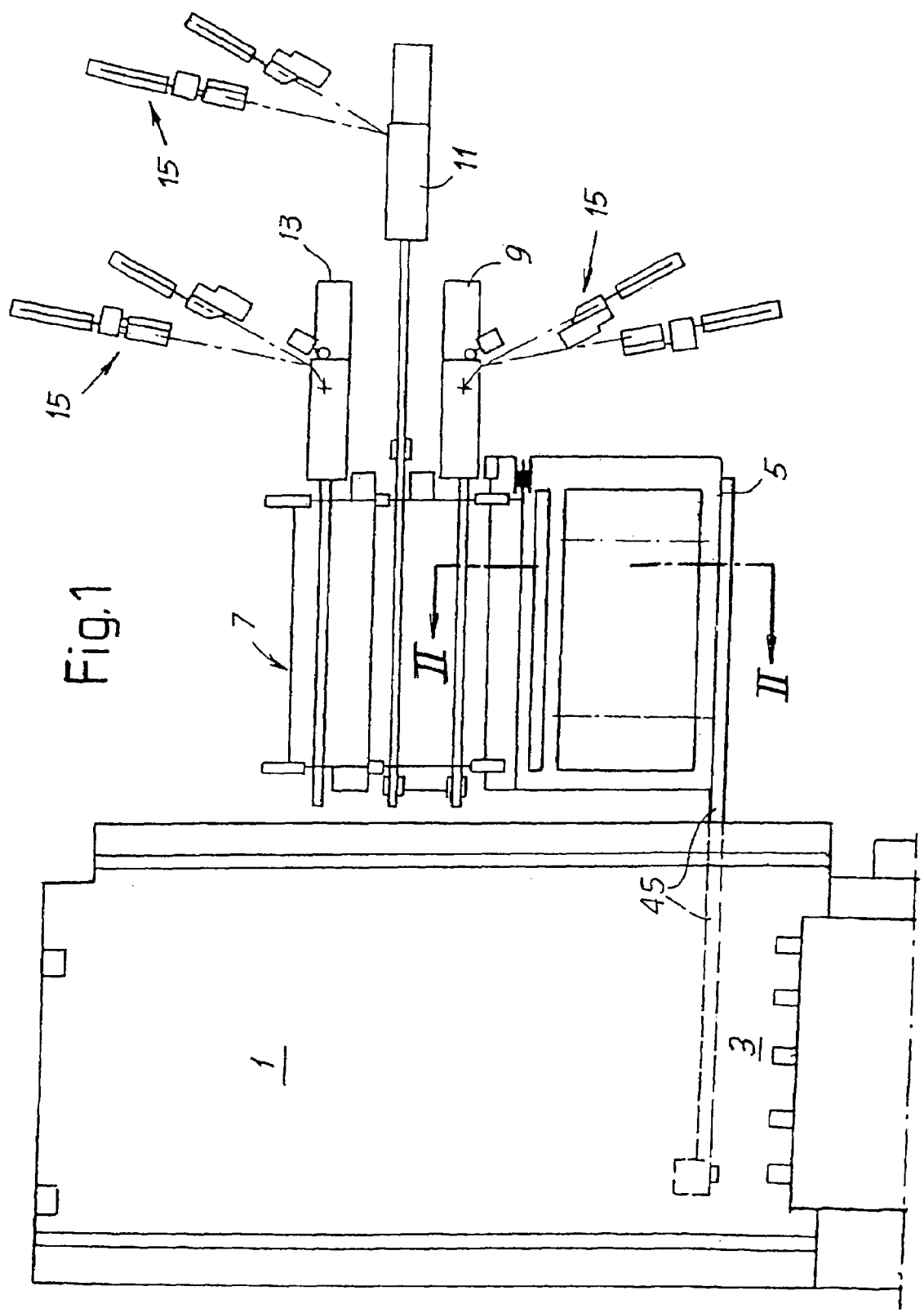
FIG. 1 shows a schematic plan view of the layout of a system comprising a storage unit according to the invention.

FIG. 1 summarily shows a layout of a paper processing plant to produce logs of web material. The number 1 generically indicates the area housing the unwinders of the parent reels from which the web material is fed, while number 3 indicates the area, where the rewinder is located. Other stations, not shown, are disposed downstream of the rewinder, typically one or more gluing units, a log storage unit, one or more cutting machines and a packaging machine.

Disposed at the side of the area 1, 3 occupied by the unwinders and by the rewinder is a storage unit for the winding cores, generically indicated with 5 and which shall be described in detail hereunder. The number 7 indicates the overall dimension of a conveyor that feeds the cores to the storage unit 5. These are produced (in the example shown) by three core machines 9, 11, 13, fed by reels of cardboard strips 15. It must be clear that a different number of core machines may be used, according to the productivity of the various machines constituting the system.

The core machines 9, 11, 13 (oust as the other components of the line with the exception of the storage unit) are not described in detail herein as they are per se known. They may be of any type, for example of the type described in U.S. Pat. No. 5,873,806.

Figure 2:
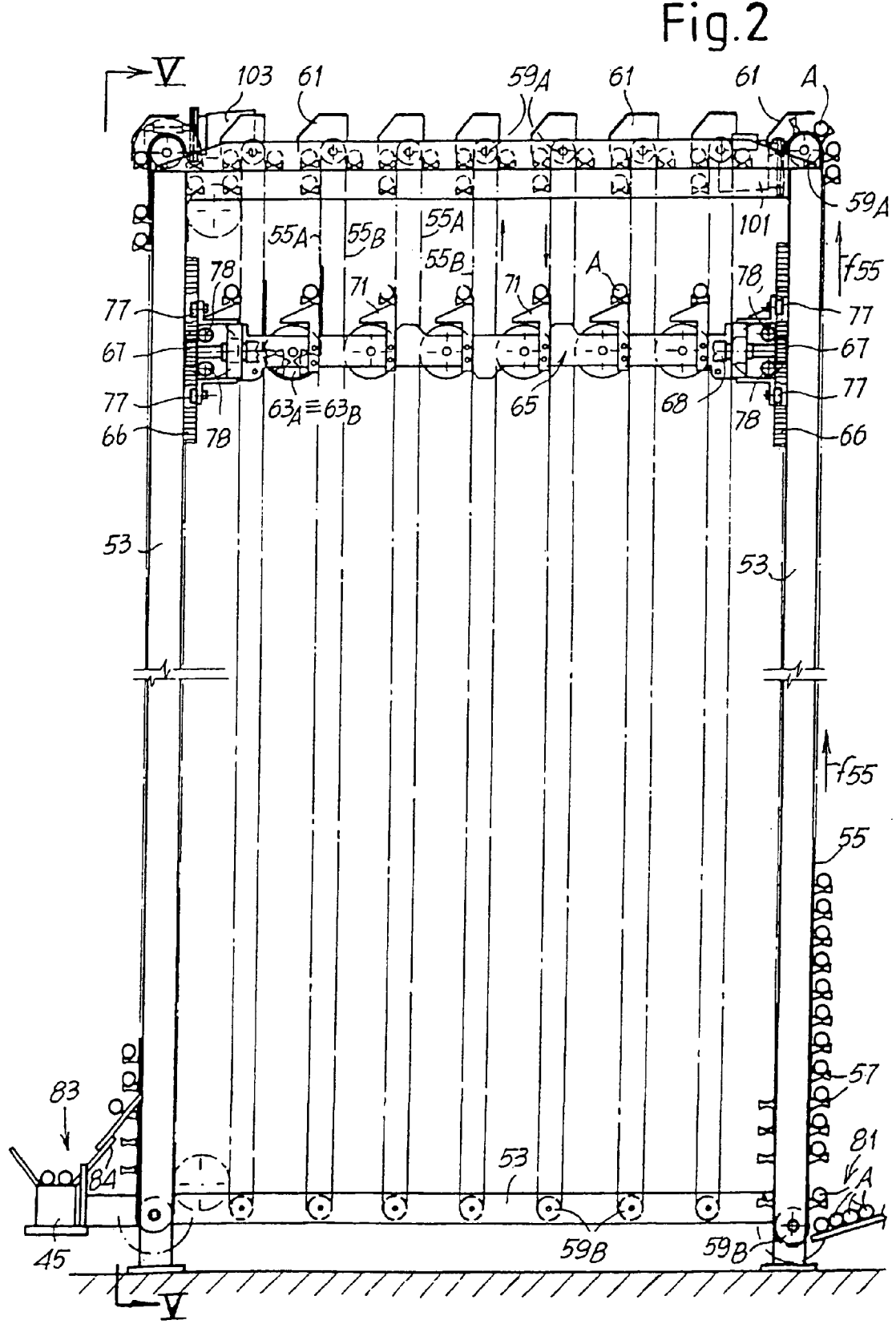
FIG. 2 shows a side view of the storage unit according to the invention in a possible embodiment.

FIG. 2 shows a side view of the storage unit, generically indicated with The cores A, produced substantially continuously by the core machines 9, 11, 13, are transported to a chute 23. From here, through gravity, the cores roll to the feed area of the storage unit 5.

Figure 5:
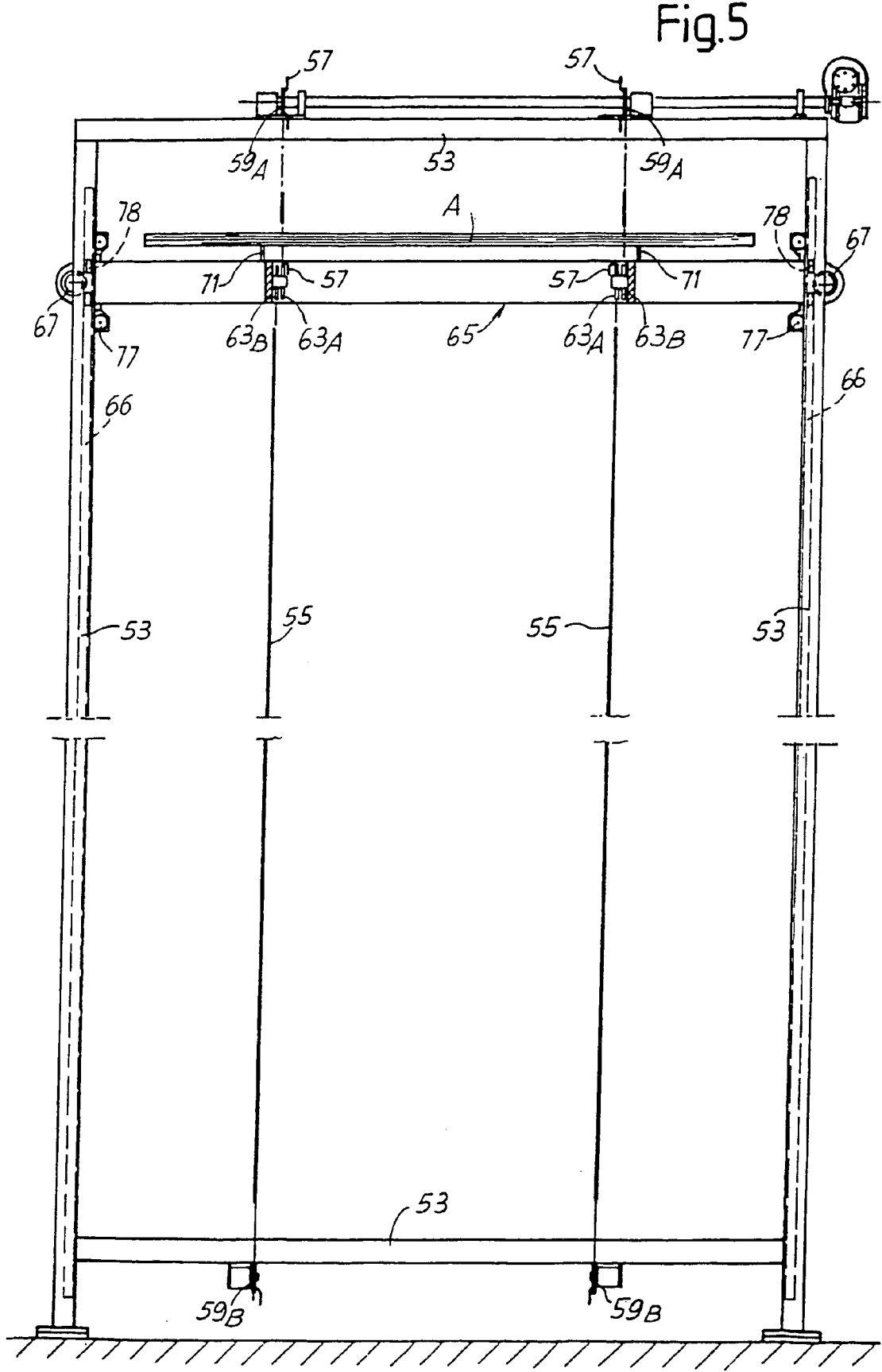
FIG. 5 shows a front view according to V-V in FIG. 2.

The storage unit 5 comprises a fixed structure 53, carrying a first series of toothed chain wheels 59A in the upper area and a second series of toothed chain wheels 59B in the lower area. The axles of the chain wheels 59A and 59B of the two series are fixed in respect of the structure 53 of the storage unit. Chains 55 are driven around the toothed wheels. In practice, as can be seen in particular in FIG. 5, the storage unit has two continuous flexible members constituted by chains 55, lying more or less on the same number of vertical planes parallel to each other and defining substantially equal closed paths. A single chain 55 and a single path are shown in FIG. 2, it being apparent that the other chain overlaps the one visible in the drawing. Analogously, respective toothed wheels which define the closed paths of the two chains are provided. Hereunder, the single chain 55, the relative driving wheels and the closed path along which it extends will be described. It must be understood that the storage unit may also have more than two chains or other flexible members parallel to one another, especially when this is required by the length of the products to be handled.

The path of each chain 55 is defined, as well as by the upper and lower toothed wheels 59A and 59B with fixed axles, carried by the fixed structure 53, also by a first series of toothed chain wheels with moving axle 63A and by a second series of toothed chain wheels with moving axle 63B.

The toothed wheels with moving axle 63A, 63B are supported by a moving unit or carriage 65 sliding vertically according to the double arrow f65 and guided along vertically extending racks 66, integral with the fixed structure 53, which mesh with pinions 67 carried by the unit 65. Opposed and coaxial pinions are keyed onto a common shaft 68. The arrangement of the racks 66 and pinions 67 with respective shafts allows the moving unit 65 always to translate parallel to itself without tilting. Moreover, lateral guide rollers 77, 78 are provided on corresponding vertical guides.

Figure 4:
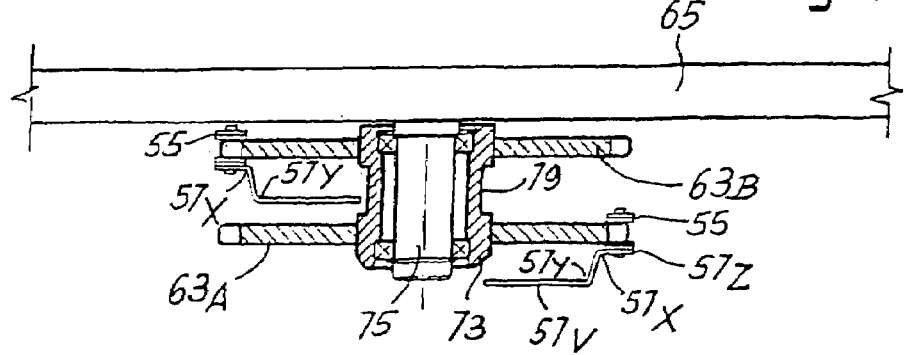
FIG. 4 shows a section according to IV-IV in FIG. 3.

The wheels with moving axle of the two series of toothed wheels 63A, 63B are disposed coaxially, so that a toothed wheel 63B of the second series is always coaxial with each toothed wheel of the first series 63A (see FIG. 4). The driving wheels 63A and 63B with moving axle are coaxial in as much as for each pair of wheels 63A, 63B, the wheel that drives the corresponding branch of the chain 55 coming from the driving wheel 59A with fixed upper axle (indicated with 63A) and the wheel that drives the branch of the chain 55 coming from the respective driving wheel 59B with fixed lower axle are keyed on a single hub 73 supported idle by a corresponding shaft 75 in turn carried projectingly by a beam which is a part of the carriage or moving unit 65 (see FIG. 4).

Supports 57 are integral with each chain 55. Each of these is rigidly fixed to a respective link of the chain 55, as shall be better described with reference to FIG. 4. As is visible in FIG. 2, the supports 57 all project from the same side of the chain with which they are integral. More specifically, they extend in a substantially parallel direction to the plane on which the chain 55 to which they are secured lies, that is parallel to the plane of the figure.

Figure 3:
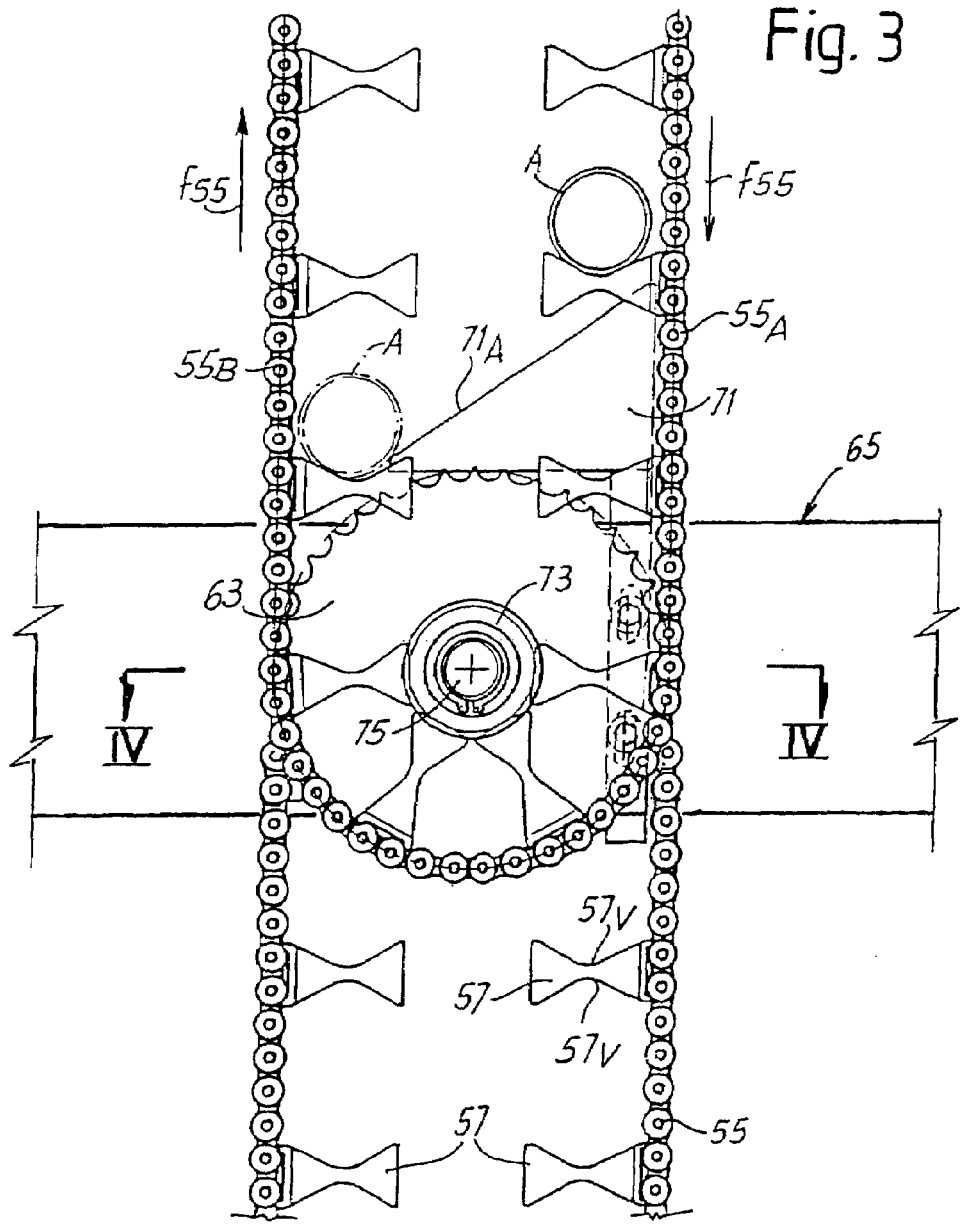
FIG. 3 shows a detail of operation of the transfer member positioned in proximity to a driving wheel.

The supports 57 have two opposed and symmetrical V-shaped resting surfaces, indicated with 57V in FIG. 3. As shall be more apparent from the description of the operating method of the storage unit, thanks to this layout the supports 57 can receive and support the cores A on one or other of the two opposed V-shaped surfaces, so that in the passage around the upper driving wheels 59A the cores A can pass from a support 57 to the support downstream (in respect of the movement of the chain 55, indicated by the arrow f55). Transfer from a surface 57V to an opposed surface 57V (although of another support) also occurs in proximity to the driving wheels 63A, as shall be described in greater detail hereunder.

Moreover, as can be seen particularly in FIG. 4, each support 57 is constituted by a laminar component secured to a respective link of the chain 55 and bent in 57X and 57Y so that the resting surfaces 57V are on planes parallel to the median plane of the driving wheels 63A, 63B, but distanced from the wheels so as not to interfere with them.

As can be seen in FIG. 2, the path of the chain 55 and the arrangement of the supports 57 secured to it are such that around the upper driving wheels with fixed axle 59A the supports 57 are located on the outside of the path, that is they extend radially away from the axle of the toothed driving wheels 59A, so as not to interfere with these wheels 59A. This is also the case in the stretch of the path of the chain around the lower toothed wheels with fixed axle of the second series 59B.

A respective guiding surface 61 extends around each of the toothed wheels 59A. This guiding surface 61 prevents the cores A from falling when the supports 57 on which they are resting move around the axle of the wheel 59A.

Moreover, the arrangement of the chain 55 and of the supports 57 is such that in the driving area around the driving wheels with moving axles of the first and of the second series 63A and 63B, the supports 57 are facing radially inwardly, that is towards the axis of the respective wheel 63A, 63B and are therefore positioned at the side of the plane on which the wheels lie, as can be seen in particular in FIGS. 3 and 4.

In proximity to each pair of driving wheels 63A, 63B, above the axle of the wheels, a respective exchange or transfer member 71 is positioned. As shall be apparent hereunder, each transfer member 71 receives the cores A resting on the supports 57 positioned on the branch 55A (see in particular FIG. 3) of the chain 55 upstream of the respective driving wheel 63A and transfers them to the supports 57 positioned on the branch 55B of the chain 55 downstream of the driving wheel 63A in respect of the direction of feed f55 of the chain along the path. In substance, the tubular cores A pass from the descending branch 55A to the ascending branch 55B tangent to each toothed driving wheel 63A, by-passing the wheel.

In this way the tubular cores A follow a trajectory which avoids each driving wheel 63A, 63B with moving axle. In substance, the path of the cores by-passes the driving wheels with moving axle carried by the moving unit 65. This on the one hand makes it possible to handle elongated products (such as tubular cores A) resting on the supports 57 positioned at a lesser distance than the axial length of the products (with the products which project even considerably beyond the surfaces defined by the supports 57) and on the other allows the driving wheels 63A and 63B to be disposed coaxially rather than one above the other, as is the case in traditional storage units, with the aforesaid advantages in terms of reducing the overall dimensions and simplifying the construction.

In particular, in the embodiment of the invention shown in the attached drawings, the transfer member 71 comprises a transfer surface 71A intersecting the trajectory of the supports 57 carried by the branches upstream and downstream (55A, 55B) of the driving wheel 63A, and inclined from the top downwards and from the branch upstream 55A towards the branch downstream 55B to cause transfer of the tubular cores A through gravity. Before reaching the respective driving wheel 63A each support 57 deposits the core A on the surface 71A. Due to the inclination of the surface 71A, each core rolls to the other branch 55B of the chain. Here it finds another support 57 that picks it up and conveys it to the subsequent driving wheel with moving axle 63A.

Therefore, the supports 57 travel the circumference of the wheels 63A without the cores, as they deposit the cores on the transfer member upstream of the wheel and pick them up again, once they are downstream of the wheel. The diameter of the driving wheels 63A, 63B and the longitudinal dimension of the supports 57 allow the supports 57 to move around the supporting hub of the driving wheels without knocking against it. FIG. 4 shows that the pair of wheels with moving axle 63A, 63B coaxial to each other are supported by a single hub 73, mounted rotatingly on the shaft 75 carried by the moving unit 65, and that this hub has, in an intermediate axial position between the two wheels 63A, 63B keyed on it, an annular groove 79 to increase the space available for the supports 57.

The transfer members 71, which may be constituted by simple appropriately cut lengths of sheet metal, may advantageously be adjustable in position in respect of the axle of the respective wheels 63A, so that each core A reaches the respective branch 55B of the chain more or less at the moment in which a support 57 integral with the branch.55B transits in front of the surface 71A of the transfer member.

This prevents the core from resting on 10 the chain 55 or in any case reduces the contact time with the chain. A sufficiently limited distance between the lower end of the surface 71A and the branch 55B of the chain ensures that the core A does not come into contact with the underlying wheel 63A or 63B.

Operation of the storage unit described hereinbefore is as follows. In a loading station, indicated generically with 81, the cores A coming from the chute 23, are individually picked up by supports 57 carried by the chain 55. The direction of feed of the branch of the chain 55 facing the chute 23 is from the bottom upwards and this causes the individual cores to be raised from the chute towards the top of the storage unit. As the storage unit is provided with two chains 55 parallel with each other, each core is picked up resting on a pair of supports 57 integral with the two chains 55.

Continuing feed of the chains 55 according to the arrow f55, the cores A picked up from the chute 23 rotate around the axle of the first driving wheel with fixed axle 59A, that is around the top right wheel in FIG. 2. The path of the cores then continues until it intercepts the transfer member 71 associated with the first of the driving wheels with moving axle 63A. Thanks to the operation described hereinbefore, before the cores interfere with this wheel they are transferred by the transfer member 71 by-passing the wheel 63A (and the wheel 63B coaxial to it) to the branch 55B of the chain 55 downstream of this wheel.

From here the cores continue substantially in the same way along the stretch of path which extends between the upper driving wheels with fixed axle 59A and the driving wheels with moving axle 63A, again by-passing the driving wheels 63A (and the driving wheels 63B coaxial to it) thanks to the transfer member's 71.

Finally, the cores reach the leftmost vertical stretch in FIG. 2, which moves from the top downwards. Along this stretch each single core is intercepted in an unloading station 83 by a chute 84, formed of two or more inclined section bars, which cause it to drop onto the conveyor 45 (FIGS. 1 and 2).

The remaining stretch of the path of each chain 55, which extends between the lower driving wheels with fixed axle 59B and the driving wheels with moving axle 63B, has no tubular cores A, and the various supports 57 are thus empty when they reach the lower end of the first ascending stretch of the chain, in front of the chute 23.

From the description hereinbefore it is clear that the chains 55 always move along the respective closed path in the same direction, transferring the cores A from the loading station 81 to the unloading station 83. The supports 57 which are located along the portion of the path between the loading station 81 and the unloading station 83 are loaded with the cores A, while the supports 57 which are located along the path from the unloading station 83 to the loading station 81 are empty.

The storage unit thus acts as a FIFO (First In-First Out) unit in the sense that the first core A to be loaded into the storage unit is also the first to be unloaded.

Movement is imparted to the chains 55 by a pair of motors 101 and 103 disposed on the upper part of the fixed structure 53, which cause the chains to move individually respectively in the feed area and in the unloading area of the cores. This makes it possible, in a per se known way, for a different number of cores A to be fed to the inlet than the number of cores unloaded at the outlet during the unit of time. The excess is stored in the storage unit if the feed flow rate is above the delivery flow rate. In the opposite case, the shortage in flow will be supplied by the material stored in the storage unit, with consequent reduction in the number of cores contained in the storage unit. Modulation of the speed of the first ascending branch of the chain makes it possible to slow down or stop the chain in front of the chute 23 when the number of cores per unit of time reaching it is limited or the flow of cores coming from the core machines actually stops. This guarantees that all the supports 57 located in the stretch of path from the feed station to the delivery station are filled with the respective tubular cores A, to obtain a regular flow of product being delivered.

If the flow rates of tubular cores A being fed and delivered are the same, the moving unit 65 maintains the same position. However, if the two flow rates are temporarily different from each other, the moving unit 65 will move. It will move upwards if the quantity of cores delivered during the unit of time is greater than the quantity of cores fed and will move downwards in the opposite case.

As the chains 55 are driven around toothed driving wheels 59A, 59B, 63A, 63B, they are usually subject to vibrations, due to inevitable impacts between the links of the chains and the teeth of the toothed wheels, and to the fact that the chains bend according to polygons whose sides correspond to the single chain links.

Figure 6:
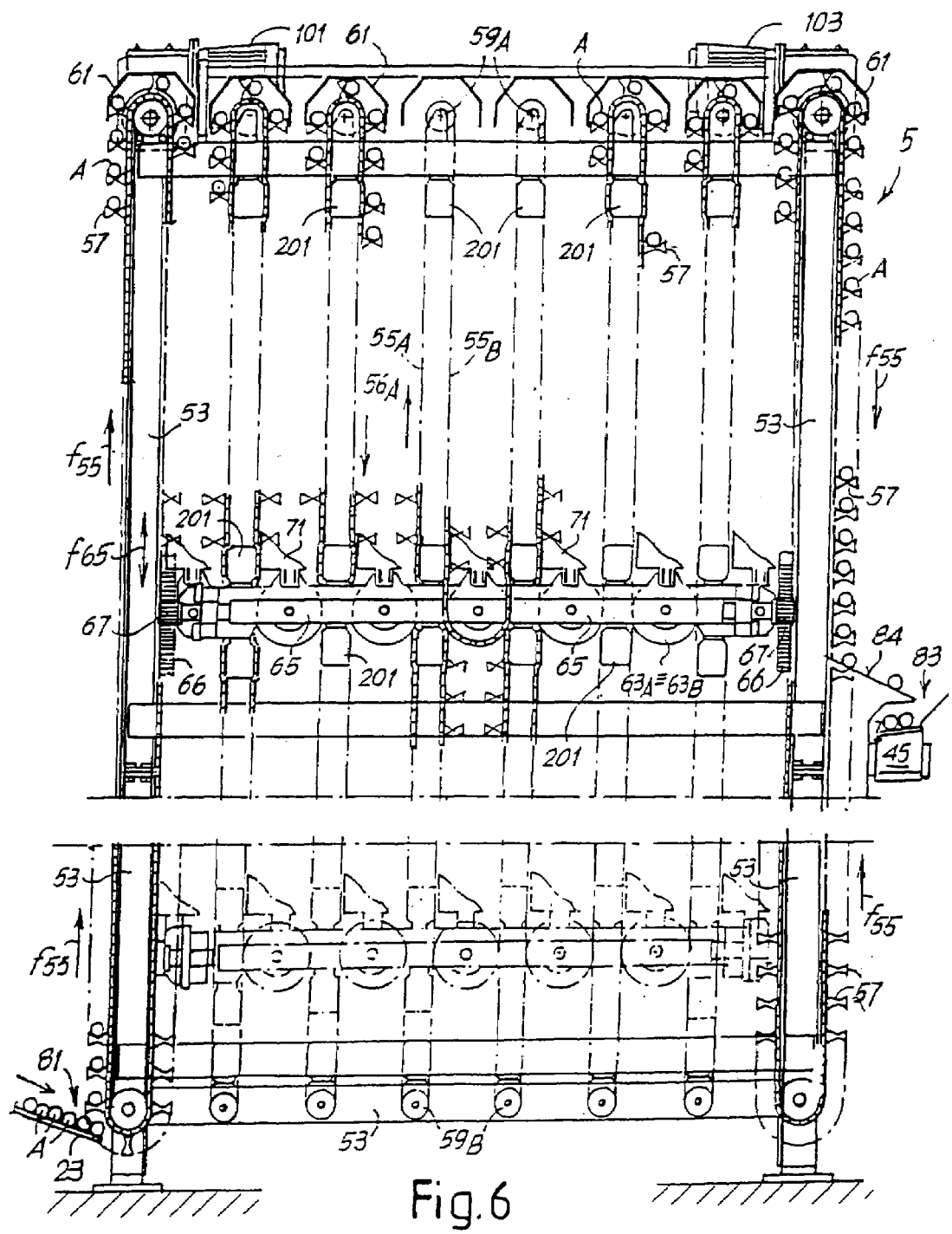
FIG. 6 shows a side view of the storage unit according to the invention in an improved embodiment of the invention.
Figure 7:
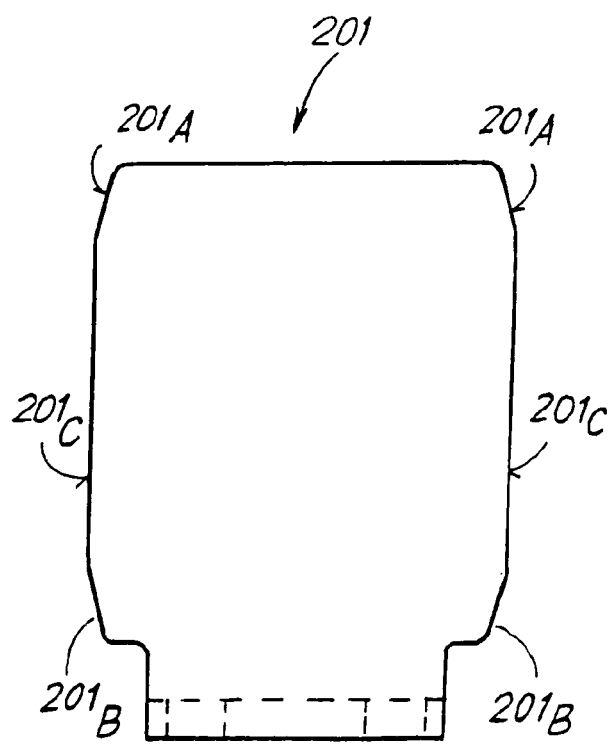
FIGS. 7 and 8 show a front view and a side view of a sliding block to reduce the vibrations of the chains of the storage unit in FIG. 6.
Figure 8:
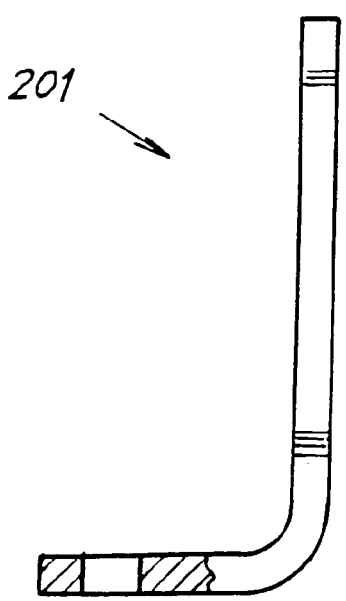

To reduce these vibrations or actually eliminate propagation along the branches of the chain, an improved embodiment of the storage unit according to the invention may be provided, shown in FIGS. 6, 7 and 8, where equal or corresponding parts to those of the previous embodiment are indicated with the same reference numbers.

In the example in FIG. 6, guiding sliding blocks 201 are associated under each upper toothed driving wheel 59A with fixed axis (if need be excluding the two end wheels). Each slidingblock 201 is in contact with two parallel branches of the respective flexible member 55, which are in contact with the corresponding driving wheel. The width of the sliding block is slightly greater than the distance said two branches would adopt if they were normally extended between the driving wheel 59A and the corresponding underlying wheels 63 carried by the moving unit 65. They have two lateral sides (FIG. 7) constituted by a rectilinear edge 201C and by two bevels 201A, 201B. The flexible member is therefore diverted slightly from its normal rectilinear path passing on one or other of the bevels 201A, 201B so that each branch is divaricated in respect of the parallel branch driven by the same driving wheel 59A. An analogous situation is obtained for the lower driving wheels 59B (see FIG. 6).

The same sliding blocks 201 are also mounted on the moving unit 65. In more detail, two series of sliding blocks are disposed on the unit 65, respectively associated with the branches extending from the wheels 65A towards the wheels 59A and, respectively, from the wheels 65B towards the wheels 59B. In both cases they are disposed between parallel branches in contact with two driving wheels 65A or 65B adjacent to each other and not between branches driven by the same wheel.

The branches of the flexible members 55 are thus held in a slightly divaricated position adjacent to the driving wheels. This contact and slight forcing on the driving members substantially blocks propagation of vibrations from the driving wheels along the free branches of the flexible members.

It is understood that the drawing only shows an example provided purely as a practical example of the invention, as said invention may vary in forms and arrangements without however departing from the scope of the concept underlying the invention. Any reference numerals in the attached claims are provided purely for the purpose of facilitating reading in the light of the description hereinbefore and of the attached drawings and do not limit the scope of protection represented by the claims whatsoever.

The invention claimed is:

1. A storage unit for storing elongated products comprising at least two flexible members, wherein each of said at least two flexible members are equipped with supports having at least one product supporting surface for said products, are constructed and arranged to extend and move along respective parallel paths and are defined by a plurality of driving wheels, wherein:

said supports project laterally from each of said at least two flexible members; and in each of said paths in proximity to at least one driving wheel of said plurality of driving wheels a transfer member is present for receiving said products from the supports located on a first branch of each of said at least two flexible members at a point upstream of said at least one driving wheel and for transferring the products from the supports on the first branch to the supports located on a second branch of a corresponding one of each of said at least two flexible members downstream of said at least one driving wheel with respect to a direction of feed of the flexible members along the respective parallel paths, so that the products are moved from the first branch to the second branch of a common flexible member following a trajectory that by-passes said at least one driving wheel.

2. Storage unit as claimed in claim 1, wherein said at least two flexible members are continuous and extend along closed paths.

3. A storage unit for storing elongated products comprising at least two flexible members, wherein each of said at least two flexible members are equipped with supports having at least one product supporting surface for said products, are constructed and arranged to extend and move along respective parallel oaths and are defined by a plurality of driving wheels, wherein:

said supports project laterally from each of said at least two flexible members; and in each of said paths in proximity to at least one driving wheel of said plurality of driving wheels a transfer member is present for receiving said products from the supports located on a first branch of one of said at least two flexible members at a point upstream of said at least one driving wheel and for transferring the products to the supports located on a second branch of said one of said at least two flexible members downstream of said at least one driving wheel with respect to a direction of feed of the flexible members along the respective parallel paths, so that the products follow a trajectory that by-passes said at least one driving wheel, and wherein each of said supports has two opposed product supporting surfaces to receive and hold said products on one or other of two sides of each of said supports.

4. Storage unit as claimed in claim 1, wherein each of said supports projects from a same side of a respective one of said flexible members.

5. Storage unit as claimed in claim 1, wherein said supports extend at least partially approximately according to a plane parallel to a plane on which one of said at least two flexible members lies.

6. Storage unit as claimed in claim 5, wherein said supports project from the one of said at least two flexible members in a direction so that the supports are oriented radially towards an axle of the at least one driving wheel with which said transfer member is associated.

7. A storage unit for storing elongated products comprising at least two flexible members, wherein each of said at least two flexible members are equipped with supports having at least one product supporting surface for said products, are constructed and arranged to extend and move along respective parallel paths and are defined by a plurality of driving wheels, wherein:

said supports project laterally from each of said at least two flexible members; and in each of said paths in proximity to at least one driving wheel of said plurality of driving wheels a transfer member is present for receiving said products from the supports located on a first branch of one of said at least two flexible members at a point upstream of said at least one driving wheel and for transferring the products to the supports located on a second branch of said one of said at least two flexible members downstream of said at least one driving wheel with respect to a direction of feed of the flexible members along the respective parallel paths, so that the products follow a trajectory that by-passes said at least one driving wheel, and wherein said transfer member comprises a transfer surface intersecting a trajectory of the supports carried by the first branch upstream and the second branch downstream of said at least one driving wheel, and inclined from a top thereof downwards and from the first branch upstream towards the second branch downstream to cause transfer of said products by gravity, said paths extending along planes that lie substantially vertically.

8. Storage unit as claimed claim 2, wherein each of said closed paths is defined by at least a first series and a second series of driving wheels with fixed axle, and by a first series and a second series of driving wheels with moving axle carried by a moving unit between the first series and the second series of driving wheels with fixed axle, and wherein a respective transfer member carried by said moving unit is associated with each of said driving wheels of said first series of driving wheels with moving axis.

9. Storage unit as claimed in claim 8, wherein each transfer member transfers the products from the first branch to the second branch of the one of said at least two flexible members, tangent to the driving wheels with moving axle with which said transfer member is associated.

10. Storage unit as claimed in claim 8, wherein the supports are mounted projectingly on the one of said at least two flexible members so that in an area where the one of said at least two flexible members is driven around the driving wheels with moving axle the supports are oriented radially towards the moving axle of said driving wheels.

11. A storage unit for storing elongated products comprising at least two flexible members, wherein each of said at least two flexible members are equipped with supports having at least one product supporting surface for said products, are constructed and arranged to extend and move along respective parallel oaths and are defined by a plurality of driving wheels, wherein:

said supports project laterally from each of said at least two flexible members; and in each of said paths in proximity to at least one driving wheel of said plurality of driving wheels a transfer member is present for receiving said products from the supports located on a first branch of one of said at least two flexible members at a point upstream of said at least one driving wheel and for transferring the products to the supports located on a second branch of said one of said at least two flexible members downstream of said at least one driving wheel with respect to a direction of feed of the flexible members along the respective parallel paths, so that the products follow a trajectory that by-passes said at least one driving wheel, wherein said at least two flexible members are continuous and extend along closed paths, wherein each of said closed paths is defined by at least a first series and a second series of driving wheels with fixed axle, and by a first series and a second series of driving wheels with moving axle carried by a moving unit between the first series and the second series of driving wheels with fixed axle, and wherein a respective transfer member carried by said moving unit is associated with each of said driving wheels of said first series of driving wheels with moving axis, and wherein each wheel of the first series of driving wheels with moving axle is coaxial to a corresponding wheel of the second series of driving wheels with moving axle.

12. Storage unit as claimed in claim 1, wherein said transfer member is adjustable in position in respect of the at least one driving wheel with which the transfer member is associated.

13. Storage unit as claimed in claim 1, wherein said supports comprise laminar components rigidly secured to one of said at least two flexible members.

14. A storage unit for storing elongated products comprising at least two flexible members, wherein each of said at least two flexible members are equipped with supports having at least one product supporting surface for said products, are constructed and arranged to extend and move along respective parallel paths and are defined by a plurality of driving wheels, wherein:

said supports project laterally from each of said at least two flexible members; and in each of said paths in proximity to at least one driving wheel of said plurality of driving wheels a transfer member is present for receiving said products from the supports located on a first branch of one of said at least two flexible members at a point upstream of said at least one driving wheel and for transferring the products to the supports located on a second branch of said one of said at least two flexible members downstream of said at least one driving wheel with respect to a direction of feed of the flexible members along the respective parallel paths, so that the products follow a trajectory that by-passes said at least one driving wheel, wherein said supports comprise laminar components rigidly secured to the one of said at least two flexible members, and wherein each of said supports has an end secured to the one of said at least two flexible members and a portion forming said product supporting surface for said products, and is bent between said end and said product supporting surface to distance the product supporting surface from the plane on which the one of said at least two flexible members lies.

15. Storage unit as claimed in claim 1, wherein said flexible members comprise chains.

16. Storage unit as claimed in claim 15, wherein each of said supports is rigidly secured to a respective link of the chains.

17. A storage unit for storing elongated products comprising at least two flexible members, wherein each of said at least two flexible members are equipped with supports having at least one product supporting surface for said products, are constructed and arranged to extend and move along respective parallel paths and are defined by a plurality of driving wheels, wherein:

said supports project laterally from each of said at least two flexible members; and in each of said paths in proximity to at least one driving wheel of said plurality of driving wheels a transfer member is present for receiving said products from the supports located on a first branch of one of said at least two flexible members at a point upstream of said at least one driving wheel and for transferring the products to the supports located on a second branch of said one of said at least two flexible members downstream of said at least one driving wheel with respect to a direction of feed of the flexible members along the respective parallel paths, so that the products follow a trajectory that by-passes said at least one driving wheel, wherein said at least two flexible members are continuous and extend along closed paths, wherein each of said closed paths is defined by at least a first series and a second series of driving wheels with fixed axle, and by a first series and a second series of driving wheels with moving axle carried by a moving unit between the first series and the second series of driving wheels with fixed axle, and wherein a respective transfer member carried by said moving unit is associated with each of said driving wheels of said first series of driving wheels with moving axis, wherein the supports are mounted projectingly on the one of said at lest two flexible members so that in an area where the one of said at least two flexible members is driven around the driving wheels with moving axle the supports are oriented radially towards the moving axle of said driving wheels, and wherein pairs of the driving wheels with moving axle coaxial with each other are supported by a single hub, mounted rotatingly on a shaft carried by said moving unit, and wherein said hub has, in an axially intermediate position between one of the pairs of driving wheels supported on the single hub, an annular groove.

18. Storage unit as claimed in claim 8, wherein the driving wheels with moving axle have a larger radius than the driving wheels with fixed axle.

19. Storage unit as claimed in claim 1, wherein a section bar to guide and hold the products resting on said supports extends around at least some of said driving wheels.

20. Storage unit as claimed in claim 1, wherein said flexible members move along the respective parallel paths in a same direction, transferring the products from a loading station to an unloading station, the supports located along a portion of the paths between the loading station and the unloading station being loaded with said products, and the supports located along the paths from the unloading station to the loading station being empty.

21. A storage unit for storing elongated products comprising at least two flexible members, wherein each of said at least two flexible members are equipped with supports having at least one product supporting surface for said products, are constructed and arranged to extend and move along respective parallel paths and are defined by a plurality of driving wheels, wherein:

said supports project laterally from each of said at least two flexible members; and in each of said paths in proximity to at least one driving wheel of said plurality of driving wheels a transfer member is present for receiving said products from the supports located on a first branch of one of said at least two flexible members at a point upstream of said at least one driving wheel and for transferring the products to the supports located on a second branch of said one of said at least two flexible members downstream of said at least one driving wheel with respect to a direction of feed of the flexible members along the respective parallel paths, so that the products follow a trajectory that by-passes said at least one driving wheel, and wherein at least one guiding sliding block is disposed between at least the first branch and the second branch of each of said flexible members in contact with said first branch and said second branch.

22. Storage unit as claimed in claim 21, wherein said at least one guiding sliding block is disposed in a vicinity of one or more of the driving wheels, in contact with said first branch and said second branch of the one of said at least two flexible members.

23. Storage unit as claimed in claim 21, wherein said guiding sliding block has a width greater than a distance between said first branch and said second branch of the one of said at least two flexible members, said first branch and said second branch being divaricated by said at least one guiding sliding block.

24. Storage unit as claimed in claim 21, wherein one of said at least one guiding sliding block is disposed at the driving wheels of said first series and said second series of driving wheels with fixed axle, in contact with the first branch and the second branch of the one of said at least two flexible members in contact with a respective driving wheel with fixed axle.

25. A storage unit for storing elongated products comprising at least two flexible members, wherein each of said at least two flexible members are equipped with supports having at least one product supporting surface for said products, are constructed and arranged to extend and move along respective parallel oaths and are defined by a plurality of driving wheels, wherein:

said supports project laterally from each of said at least two flexible members; and in each of said paths in proximity to at least one driving wheel of said plurality of driving wheels a transfer member is present for receiving said products from the supports located on a first branch of one said at least two flexible members at a point upstream of said at least one driving wheel and for transferring the products to the supports located on a second branch of said one of said at least two flexible members downstream of said at least one driving wheel with respect to a direction of feed of the flexible members along the respective parallel paths, so that the products follow a trajectory that by-passes said at least one driving wheel, wherein said at least two flexible members are continuous and extend along closed paths, wherein each of said closed paths is defined by at least a first series and a second series of driving wheels with fixed axle, and by a first series and a second series of driving wheels with moving axle carried by a moving unit between the first series and the second series of driving wheels with fixed axle, and wherein a respective transfer member carried by said moving unit is associated with each of said driving wheels of said first series of driving wheels with moving axis, and wherein said moving unit carries respective guiding sliding blocks disposed between parallel branches of a driving member between two adjacent driving wheels carried by said moving unit.

26. Storage unit as claimed in claim 21, wherein said at least one guiding sliding block has sides with bevels.

27. Storage unit as claimed in claim 26, wherein said sides have parallel rectilinear portions extending between said bevels.

28. A storage unit for storing elongated products comprising at least two flexible members, wherein each of said at least two flexible members are equipped with supports having at least one product supporting surface for said products, are constructed and arranged to extend and move along respective parallel paths and are defined by a plurality of driving wheels, wherein:

said supports project laterally from each of said at least two flexible members; and in each of said paths in proximity to at least one driving wheel of said plurality of driving wheels a transfer member is present for receiving said products from the supports located on a first branch of one of said at least two flexible members at a point upstream of said at least one driving wheel and for transferring the products to the supports located on a second branch of said one of said at least two flexible members downstream of said at least one driving wheel with respect to a direction of feed of the flexible members along the respective parallel paths, so that the products follow a trajectory that by-passes said at least one driving wheel, wherein said at least two flexible members are continuous and extend along closed paths, and wherein each of said supports has two opposed product supporting surfaces to receive and hold said products on one or other of two sides of each of said supports.

* * * * *

UNITED STATES PATENT AND TRADEMARK OFFICE
CERTIFICATE OF CORRECTION

| | |
|---|---|
| PATENT NO. | : 7,258,221 B2 |
| APPLICATION NO. | : 10/520895 |
| DATED | : August 21, 2007 |
| INVENTOR(S) | : Walter Di Nardo et al. |

It is certified that error appears in the above-identified patent and that said Letters Patent is hereby corrected as shown below:

Column 1,

Line 20, "winding, cores" should read -- winding cores --.

Column 4,

Line 16, "the area, where" should read -- the area where --.

Column 4,

Line 31, "(oust as the" should read -- (just as the --.

Column 4,

Line 38, "with The cores" should read -- with 5. The cores --.

Column 6,

Line 50, "again, once" should read -- again once --.

Column 6,

Line 66, "branch. 55B" should read -- branch 55B --.

Column 7,

Line 1, "resting on 10 the chain" should read -- resting on the chain --.

Column 7,

Line 34, "transfer member's 71" should read -- transfer members 71 --.

Column 8,

Line 34, "slidingblock 201" should read -- sliding block 201 --.

Column 9,

Line 38, Claim 3, "parallel oaths" should read -- parallel paths --.

Column 10,

Line 58, Claim 11, "parallel oaths" should read -- parallel paths --.

Column 12,

Line 31, Claim 17, "at lest" should read -- at least --.

UNITED STATES PATENT AND TRADEMARK OFFICE
CERTIFICATE OF CORRECTION

PATENT NO. : 7,258,221 B2
APPLICATION NO. : 10/520895
DATED : August 21, 2007
INVENTOR(S) : Walter Di Nardo et al.

It is certified that error appears in the above-identified patent and that said Letters Patent is hereby corrected as shown below:

Column 13,

Line 38, Claim 25, "parallel oaths" should read -- parallel paths --.

Signed and Sealed this

First Day of September, 2009

David J. Kappos
*Director of the United States Patent and Trademark Office*